(12) United States Patent
Obenauf (10) Patent No.: US 9,360,158 B1
(45) Date of Patent: Jun. 7, 2016

(54) GARMENT CARRIER AND SUPPORT DEVICE

(71) Applicant: Marya Obenauf, Fresno, CA (US)

(72) Inventor: Marya Obenauf, Fresno, CA (US)

( * ) Notice: Subject to any disclaimer, the term of this patent is extended or adjusted under 35 U.S.C. 154(b) by 0 days.

(21) Appl. No.: 14/852,788

(22) Filed: Sep. 14, 2015

(51) Int. Cl.
A45F 5/00 (2006.01)
F16M 13/06 (2006.01)
A45F 5/10 (2006.01)

(52) U.S. Cl.
CPC ............... *F16M 13/06* (2013.01); *A45F 5/102* (2013.01)

(58) Field of Classification Search
CPC ........... F16B 13/06; A45F 5/102; A45F 5/10; A45F 5/1026; A45F 2005/1033; A47G 25/1457
USPC ............ 294/142, 26, 170; 248/690, 304, 301, 248/914; 223/1, 85; 16/430
See application file for complete search history.

(56) References Cited

U.S. PATENT DOCUMENTS

| | | | | |
|---|---|---|---|---|
| 849,897 | A * | 4/1907 | Hall | B25J 15/0616 |
| | | | | 16/DIG. 15 |
| 1,702,946 | A * | 2/1929 | Powers | B66C 1/34 |
| | | | | 24/129 R |
| 2,892,269 | A * | 6/1959 | Pospiszel | G09F 5/00 |
| | | | | 211/57.1 |
| 3,799,416 | A * | 3/1974 | Schmaltz | A45F 5/10 |
| | | | | 248/214 |
| 4,029,212 | A | 6/1977 | Uadiski | |
| 4,094,391 | A * | 6/1978 | Ratchford | A45C 5/143 |
| | | | | 190/108 |
| 4,153,189 | A | 5/1979 | Hughes | |
| 4,278,177 | A | 7/1981 | Fahmi | |
| 4,709,954 | A | 12/1987 | Beyda et al. | |
| 4,824,156 | A | 4/1989 | Greene | |
| D343,521 | S * | 1/1994 | Wigley, Sr. | 294/137 |
| 5,405,067 | A | 4/1995 | Huges | |
| D378,167 | S | 2/1997 | Jones, Jr. | |
| 5,620,127 | A | 4/1997 | MacKenzie | |
| 5,833,184 | A | 11/1998 | Scola | |
| 5,957,518 | A | 9/1999 | Elliott | |
| 5,971,458 | A | 10/1999 | Contreras et al. | |
| 6,003,918 | A | 12/1999 | Hulyk | |
| D440,147 | S | 4/2001 | Rimback | |
| 6,658,701 | B1 * | 12/2003 | DeHart | A45F 5/10 |
| | | | | 16/422 |
| 7,052,057 | B2 * | 5/2006 | Hiles | A01K 97/14 |
| | | | | 294/142 |
| 7,322,554 | B2 * | 1/2008 | Caroselli | A47G 29/083 |
| | | | | 223/120 |

* cited by examiner

*Primary Examiner* — Gabriela Puig (74) *Attorney, Agent, or Firm* — Richard A. Ryan (57) ABSTRACT

A garment carrier and support device for allowing a user to easily, comfortably and efficiently transport one or more hangers that each have clothing thereon and to support such hangers and clothing from a vehicular hook member, vehicular hand support, support rod or other fixture. The carrier device is particularly useful for transporting and hanging dry cleaning. The preferred carrier device has a handle member defining a handle grip, a cap member at the upper end of the handle defining a downwardly disposed hand contact surface, an upper curved arm adapted to hang the carrier member from the fixture and a lower curved arm configured to support the hangers. The hand contact surface distributes the weight of the clothing on the user's hand. An upwardly extending section near the distal end of the lower curved arm prevents the hangers from easily sliding off of the carrier device.

13 Claims, 8 Drawing Sheets

GARMENT CARRIER AND SUPPORT DEVICE

CROSS-REFERENCE TO RELATED APPLICATIONS

None.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to devices for supporting hangers and, more specifically, to a device for collecting, carrying, supporting and transporting garments hung on hangers. Even more specifically, the present invention relates to hanger support devices that allow the user to support such hanger-hung garments on a hook, loop, handle or other support member, including vehicular hook or handle members.

B. Background

As is generally well known, it is very common to hang garments such as shirts, pants, blouses, dresses, jackets, suits and other clothing on hangers, including those which are specifically configured for particular clothing types or styles. Standard hangers have body portion on which the clothing is hung or otherwise supported and a hook portion that is configured to be hung on a closet rod or like support apparatus. While traveling or simply picking up and dropping off one's dry cleaning, it is often necessary for a person to carry one or more hangers laden with clothing as he or she moves through an airport, train station, bus terminal, hotel lobby or between his or her home and the dry cleaning store. To avoid wrinkling or otherwise harming the clothing, the user typically carries the hangers by the hook portion of the hanger. Unfortunately, grasping and holding a number of hangers, particularly when the clothing which they support is heavy or bulky, can be very uncomfortable, especially for persons having relatively small or sensitive hands. In addition, the hangers tend to bite into the hand and fingers generating discomfort, thereby compelling the carrier to switch the hangers from each hand to the other in order to minimize the discomfort. The level of discomfort can be significantly exasperated by the shape, material and/or configuration of the hanger, particularly those having hook portions made of thin wire frame or non-smooth inner surfaces.

To reduce the discomfort of carrying hangers laden with clothing when moving through an transportation hub or hotel lobby, many people utilize specially configured mobile carriers that have a hanger support rod on which the hanger hook portions are hung. Naturally, such mobile carriers have to be readily available, which they are often not, to be of any use. Other than utilizing a glove or other hand covering, most people do not have available a device to reduce the discomfort of moving their clothes laden hangers between the dry cleaners, car and house or office. A search of the prior art identified a number of patents that disclose various devices for carrying and supporting clothes hangers, including U.S. Pat. No. 4,709,954 to Beyda et al., U.S. Pat. No. 4,153,189 to Hughes, U.S. Pat. No. 5,971,458 to Contreras et al., U.S. Pat. No. 4,824,156 to Greene, U.S. Pat. No. 5,405,067 to Huges, U.S. Pat. No. 4,029,212 to Uadiski, U.S. Pat. No. 6,003,918 to Hulyk, U.S. Pat. No. 4,278,177 to Fahmi, U.S. Pat. No. 5,833,184 to Scola, U.S. Pat. No. D440,147 to Rimback, U.S. Pat. No. 5,957,518 to Elliott, U.S. Pat. No. 5,620,127 to MacKenzie and U.S. Pat. No. Des. 378,167 to Jones.

Despite the foregoing most people still carry clothes laden hangers by the hook portions of the hangers, merely enduring the discomfort or pain caused by the hangers and weight of the clothing on the hangers. Consequently, a need exists for a device that is adapted for collecting, carrying, supporting, and transporting dry cleaning and other garments or clothing hung on hangers in a manner which is quick, easy, and efficient to use. Such a device should be configured to be easily and comfortably supported by the hand of the user in a manner that substantially reduces or eliminates the discomfort or pain typically associated with carrying clothing laden hangers. Preferably, such an improved device should be configured to be gripped by the user while the device supports the hook portion of the clothes laden hangers. The preferred device should also be configured to hang on a hook, handle or other hook-like structure, including those commonly found in vehicles.

SUMMARY OF THE INVENTION

The garment carrier and support device of the present invention provides the benefits and solves the problems identified above. That is to say, the present invention discloses a device to allow a user to carry one or more clothing laden hangers by their hook portions without causing discomfort or pain to the hand of the user. More specifically, the garment carrier and support device of the present invention allows the user to comfortably carry a plurality of clothes laden hangers while moving through a transportation hub, hotel lobby or other area and between a dry cleaner store and the user's vehicle, home and/or office. The garment carrier and support device of the present invention is quick, easy and efficient to use for carrying a plurality of clothes laden hangers. The device is configured to be comfortably fit in and be supported by the user's hand without causing discomfort or pain to the user. The preferred device is configured to be gripped by the user while supporting one or more clothes laden hangers by their hook portions so as to reduce the likelihood of wrinkling or other damage to the clothing. The device is configured to beneficially engage and be supported by a hook, handle or other hook-like structure, including those commonly found in vehicles, while supporting a plurality of clothes laden hangers.

Briefly described according to one embodiment of the present invention, a garment carrier and support device is disclosed. The garment carrier and support device, hereinafter the "device," is adapted for collecting, carrying, and supporting clothing hung on hangers. The device comprises an upper curved arm and a lower curved arm joined by an elongated handle member. In one embodiment, the elongated handle member is provided with a circular handle grip constructed of a flexible, shape-memory, cellular foam material. The upper curved arm extends integrally from an upper end of elongated handle member and forms generally a C-shape and is adapted for positioning over a vehicular hook member or a vehicular hand support. The lower curved arm extends integrally from a lower end of the elongated handle member and forms generally a C-shape. In one embodiment, the distal end of the lower curved arm is suitably mounted with a spherical abutment element constructed of a lightweight material suitable so as to produce friction engagement between a hanger hook and the spherical abutment element upon contact by the hanger.

A first alternate embodiment is provided wherein the upper curved arm of the device is rotatably mounted to elongated handle member about the upper end thereof. The upper curved arm is adapted to rotate and be releasably secured in a first position (forward position) and a second position (rearward position) about elongated handle member. A second alternate embodiment is provided wherein the present invention is fabricated as a tubular, unitary apparatus. The device of the second alternate embodiment is constructed preferably of a lightweight, tubular flexible material. The device comprises an elongated mid section joined integrally by a lower curved leg and an upper curved leg. The mid section defines a curvilinear configuration forming a convex portion protruding above a concave portion. The mid section includes an upper bight portion and a lower bight portion. A hook portion extends upward integrally from the upper curved leg and is adapted for positioning over the vehicular hook member or vehicular hand support of a vehicle In a preferred aspect of the present invention, the garment carrier and support device comprises a handle member having a lower end and an upper end, a cap member at the upper end of the handle member, an upper curved arm extending outwardly and downwardly from the cap member and a lower curved arm extending generally outward from the lower end of the handle member. The handle member defines a handle grip having a first side, a second side, a front side and a back side that define a handle outer surface. The cap member has a front end, a back end, a first side and a second side that define a downwardly disposed hand contact surface and a peripheral edge. The hand contact surface and peripheral edge extend outwardly relative to the handle outer surface so as to abut the upper surface of a user's hand while he or she is holds the garment carrier and support device so as to distribute the weight of the clothing on the hand and substantially lessen the discomfort that would otherwise be associated with carrying the clothing. Preferably, the upper curved arm extends generally outward and downward from the front end of the cap member and is adapted for being positioned over a vehicular hook member, a vehicular hand support, a support rod or other fixture. The lower curved arm receives and supports the hanger hook of each of the hangers. In the preferred embodiment, the lower curved arm has a generally upwardly inclined section that defines a hook engaging surface on which the hanger hooks are placed. To prevent the hangers from easily sliding off of the carrier device, the upwardly inclined section disposes the distal end of the lower curved arm generally above a plane disposed substantially along the hook engaging surface. In the preferred embodiment, the handle member, the cap member, the upper curved arm and the lower curved arm are integrally formed out of plastic or like material utilizing an injection molding process. The handle member can have a plurality of cavities in the handle outer surface to reduce the weight of the carrier device and the cost of the materials for manufacturing the carrier device. Use of the carrier device of the present invention allows dry cleaning and other garments or clothing hung on one or more hangers to be collected, carried, supported and transported in a manner which is quick, easy, efficient and convenient.

Accordingly, the primary aspect of the present invention is to provide a garment carrier and support device that has the advantages discussed above and which overcomes the disadvantages and limitations associated with prior art and presently available devices for carrying clothes laden hangers.

It is an important aspect of the present invention to provide a device for easily and comfortably collecting, carrying and supporting one or more clothes laden hangers.

It is also an important aspect of the present invention to provide a device for quickly, easily and efficiently carrying and supporting a plurality of clothes laden hangers while the user thereof moves through an area or between a dry cleaner store and his or her vehicle, house and/or office.

It is also an important aspect of the present invention to provide a garment carrier and support device adapted to allow clothes hung on hangers to hang from a vehicle hook member or a vehicle hand support, thereby allowing for the convenient transport thereof.

Another important aspect of the present invention is to provide a portable, lightweight garment carrier and support device for carrying and supporting a plurality of clothes laden hangers.

Yet another important aspect of the present invention is to provide a garment carrier and support device having a upwardly disposed distal end adapted to prevent a plurality of hangers and clothes supported thereby from disengaging from the device during the transport thereof to a vehicle.

The above and other aspects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and the description provided herein show and describe certain types of clothing and hangers, as well as combinations thereof, those skilled in the art will readily understand that this is merely for purposes of simplifying the present disclosure and that the invention is not so limited.

A garment carrier and support device that is configured pursuant to various embodiments of the present invention is shown generally as 10 in FIGS. 1 through 4 and 7 through 13. As set forth in more detail below and shown in FIGS. 1 through 4 and 6, a garment carrier and support device 10, hereinafter carrier device 10, configured according to the present invention is provided for collecting, carrying, and supporting clothing 15 hung on hangers 12. The carrier device 10 generally comprises an upper curved arm 20 and a lower curved arm 30 interconnected by an elongated handle member 40. In one embodiment, the upper curved arm 20, lower curved arm 30 and elongated handle member 40 are preferably constructed of a lightweight, tubular flexible material, such as plastic, plastic polymer and thermoplastic polymer (e.g. polyvinyl chloride or PVC). The upper curved arm 20, lower curved arm 30, and elongated handle member 40 may also be constructed of a solid, flexible, lightweight material defined of any slender cross-sectional shape, e.g. circular, square, hexagonal, or any other polygonal shape. The carrier device 10 defines an overall length of approximately four to eighteen inches.

In the embodiment of FIGS. 1 through 4, handle member 40 includes an elongated, circular handle grip 44 enveloped circumferentially therearound. Handle grip 44 is attached to elongated handle member 40 using an adhesive being suitable so as to fixedly secure handle grip 44 to handle member 40. In one embodiment, the handle grip 44 is constructed of a flexible, shape-memory, cellular foam material adapted to resume its original shape if compressed. As will be readily appreciated by those skilled in the art, handle grip 44 provides the user with a comfortable grip during use of the carrier device 10 of the present invention.

The upper curved arm 20 extends integrally from an upper end 42 of elongated handle member 40 and forms generally a C-shape. The upper curved arm 20 is sized and configured for being positioned so as to supportedly engage a vehicular hook member 16 or a vehicular hand support 17 located inside a vehicle. More specifically, when positioning upper curved arm 20 over a vehicular hand support 17, the distal end 22 of upper curved arm 20 is inserted through the void 17a of vehicular hand support 17, and a hand support contact surface 24 of upper curved arm 20 is engaged against an interior upper surface 17b of hand support 17. The hand support contact surface 24 of upper curved arm 20 is defined as the arcuate or concave-shaped lower surface 24a portion thereof.

The lower curved arm 30 extends integrally from a lower end 41 of elongated handle member 40 and forms generally a C-shape. In the embodiment of FIGS. 1 through 4, a distal end 32 of lower curved arm 30 is suitably mounted with a spherical abutment element 35. In one embodiment, spherical abutment element 35 is constructed of a lightweight material suitable so as to produce friction engagement between a hanger hook 13 and spherical abutment element 35 upon contact by hanger hook 13 with spherical abutment element 35. It is envisioned that spherical abutment element 35 is constructed of a soft, rubber or rubber-like material. Spherical abutment element 35 imparts important functional utility to the present invention as will be described hereinbelow.

In using the carrier device 10, the handle grip 44 is gripped using a desired hand, and spherical abutment element 35 is passed through a number of clothes hanger hooks 13 of hangers 12 wherein each hanger 12 is supporting garments 15, such as dry cleaning, hung on a support rod 18 or similar support structure configured for supporting a number of garments 15 or dry cleaning. After passing distal end 32 of lower curved arm 30 through selected clothes hanger hooks 13, the carrier device 10 is raised so as to lift hangers 12 from the support rod 18, thereby allowing the clothes 15 to be readily transported, and handle member 40 is held generally at a horizontal orientation allowing clothes 15 to depend downwardly from lower curved arm 30 via gravitational pull. Spherical abutment element 35 acts as a stop against which the hooks 13 of hangers 12 engage, thereby retaining the hangers 12 and clothes 15 supported thereby along the lower curved arm 30 of carrier device 10 and preventing slippage therefrom. The upper curved arm 20 is then positioned over a vehicular hook member 16 or a vehicular hand support 17, thereby allowing the clothes 15 to be hung in a convenient manner, ready for transport without further adjustment.

Figure 4:
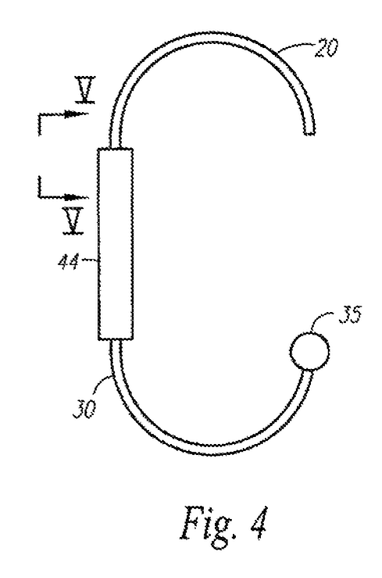
FIG. 4 is a side elevation view of a first alternate embodiment of the garment carrier and support device of the present invention.
Figure 5:
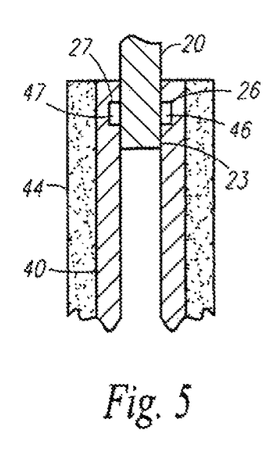
FIG. 5 is a cross-sectional view of the first alternate embodiment of the garment carrier and support device of FIG. 4 taken along lines V-V of FIG. 4 illustrating the rotatable, releasably securable upper curved arm, shown mounted to the inner circumferential sidewall of elongated handle member.
Figure 6:
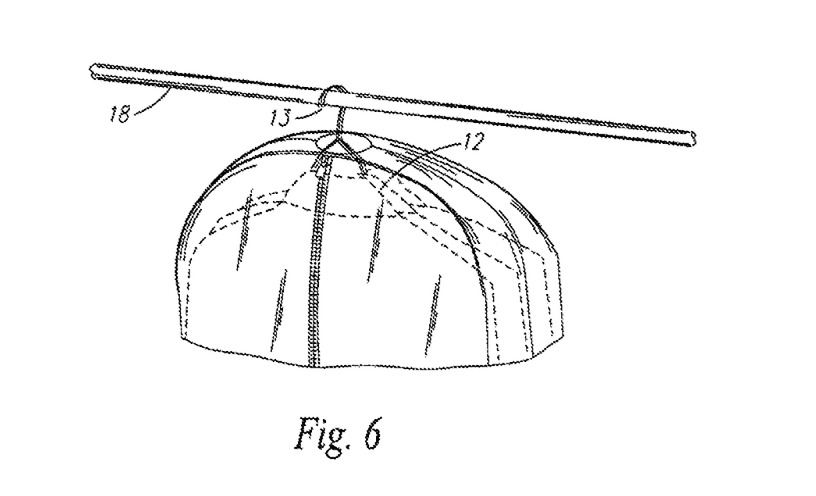
FIG. 6 is a perspective view illustrating garments supported by a hanger on a support rod.

Referring now to FIGS. 4 and 5, in accordance with an alternate embodiment, upper curved arm 20 of carrier device 10 is rotatably mounted to elongated handle member 40 about the upper end 42 thereof. Upper curved arm is adapted to rotate and be releasably secured in a first position (forward position) and a second position (rearward position) about elongated handle member 40. The upper curved arm 20 is provided with a first tab 26 opposing a second tab 27, each tab 26 and 27 is formed integral to the lower end 23 of upper curved arm 20. Each tab 26 and 27 protrudes perpendicular with respect to the lower end 23 of upper curved arm 20. The lower end 23 of upper curved arm 20 is adapted to be inserted inside the open upper end 42 of elongated handle member 40. The first tab 26 and second tab 27 are configured to mate interchangeably with a first slot 46 and a second slot 47, defined along the inner circumferential sidewall of elongated handle member 40, proximal an upper end 42 thereof. Engagement by first tab 26 with first slot 46 and second tab 27 with second slot 47, or first tab 26 with second slot 47 and second tab 27 with first slot 46 allows upper curved arm 20 to be releasably secured about elongated handle member 40 via a friction-fit connection. In order to release upper curved arm 20 from its friction-fit connection, upper curved arm 20 is rotated clockwise or counterclockwise using a degree of force necessary to facilitate release of first 26 and second 27 tab from a corresponding first 46 and second 47 slot.

Figure 7:
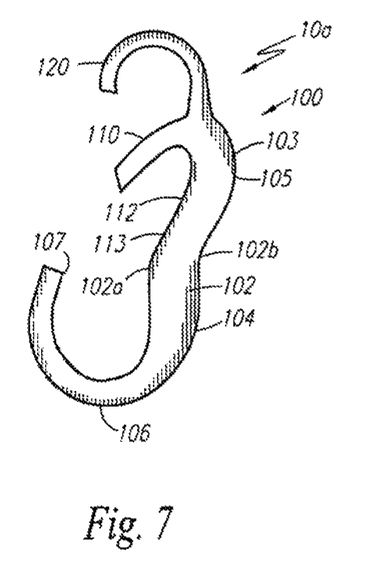
FIG. 7 is a perspective view illustrating a second alternate embodiment of the garment carrier and support device of the present invention.
Figure 8:
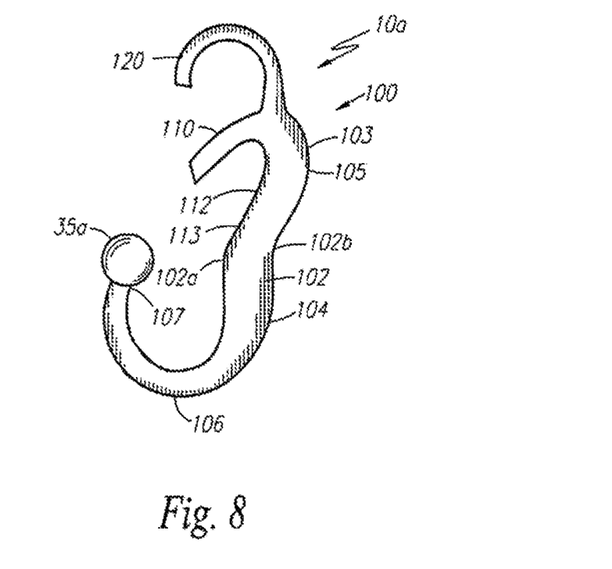
FIG. 8 is a perspective view of the second alternate embodiment of the garment carrier and support device of FIG. 7 shown with a spherical abutment element.

Referring now to FIG. 7, in accordance with another alternate embodiment, garment carrier and support device 10*a* is fabricated as a tubular, unitary apparatus 100 capable of injection molding and having a generally round cross-section. The garment carrier and support device 10*a* is constructed preferably of a lightweight, tubular flexible material, such as plastic, plastic polymer and thermoplastic polymer. Unitary apparatus 100 comprises an elongated mid section 102 joined integrally by a lower curved leg 106 and an upper curved leg 110. Mid section 102 defines a curvilinear configuration forming a convex portion 102*a* protruding above a concave portion 102*b*. Mid section 102 includes an upper bight portion 103 and a lower bight portion 104, wherein upper bight portion 103 functions as a palm rest 105. Upper curved leg 110 defines a shorter length than a length defining lower curved leg 106. Upper curved leg 110 defines a generally crispate external circumferential sidewall 112 complementary to upper bight portion 103. Crispate external circumferential sidewall 112 provides a finger-gripping surface area 113. A hook portion 120 extends upward integrally from the upper curved leg 110. The hook portion 120 is adapted for positioning over the vehicular hook member 16 or vehicular hand support 17. The lower curved leg 106 may be provided with a spherical abutment element 35*a* suitably mounted or formed integral to a distal end 107 thereof, as shown in FIG. 8.

In using the garment carrier and support device 10*a*, the palm (not shown) of user is engaged against upper bight portion 103 of mid section 102 while simultaneously gripping the finger-gripping surface area 113 using the fingers (not shown), and distal end 107 of lower curved leg 106 is passed through a number of clothes hanger hooks 13 of hangers 12 supporting clothes 15 hung on a support rod 18 or similar support structure. After passing distal end 107 of lower curved leg 106 or spherical abutment element 35*a* through selected clothes hanger hooks 13, the carrier device 10*a* is raised so as to lift hangers 12 from the support rod 18, thereby allowing the clothes 15 to be readily transported, and elongated mid section 102 is held generally at a horizontal orientation allowing clothes 15 to depend downwardly from lower curved leg 106 via gravitational pull. The hangers 12 and clothing 15 supported thereby are retained along lower curved leg 106. The upper curved leg 110 is then positioned over a vehicular hook member 16 or a vehicular hand support 17, thereby allowing the clothes 15 to be hung in a convenient manner, ready for transport without further adjustment.

Figures 1, 2, 3:
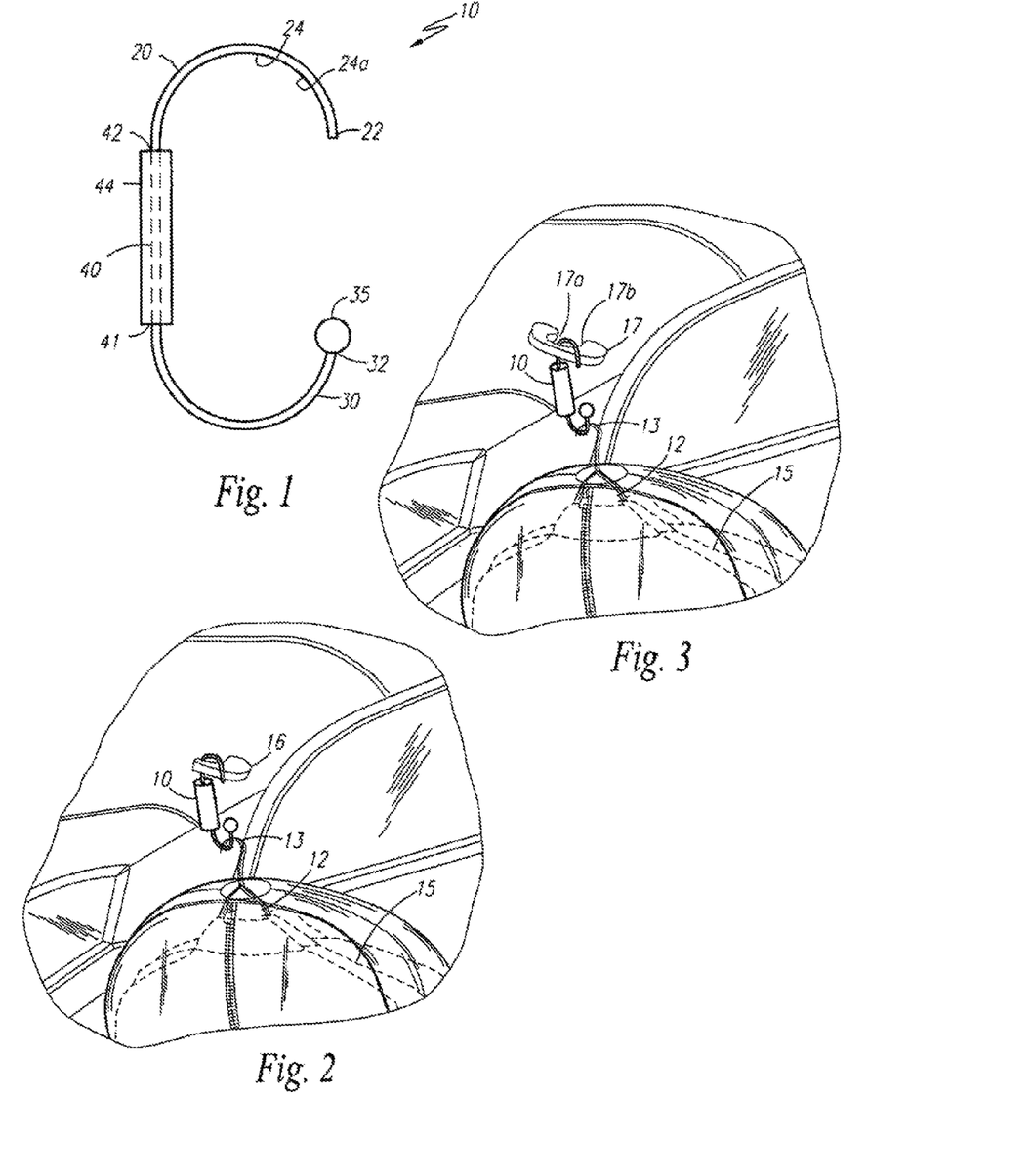
FIG. 1 is a perspective view of a garment carrier and support device configured according to one embodiment of the present invention.
FIG. 2 is a perspective view of the garment carrier and support device of FIG. 1 shown hanging from a vehicular hook member.
FIG. 3 is a perspective view of the garment carrier and support device of FIG. 1 shown hanging from a vehicular hand support.

To use the present invention, user grips handle grip 44 in a desired hand, and passes spherical abutment element 35 through a number of clothes hanger hooks 13 of hangers 12 supporting clothes 15 on a support rod 18. After passing spherical abutment element 35 through selected clothes hanger hooks 13, user raises the carrier device 10 to lift hangers 12 from the support rod 18, thereby allowing the clothes 15 to be readily transported. User next positions the upper curved arm 20 over a vehicular hook member 16 or a vehicular hand support 17, thereby allowing the clothes 15 to be hung in a convenient manner, ready for transport without further adjustment. The use of the present invention allows dry cleaning and other garments or clothing hung on hangers to be collected, carried, supported, and transported in a manner which is quick, easy, efficient, and convenient. Therefore, the foregoing description is included to illustrate the operation of the preferred embodiment and is not meant to limit the scope of the invention.

Figure 9:
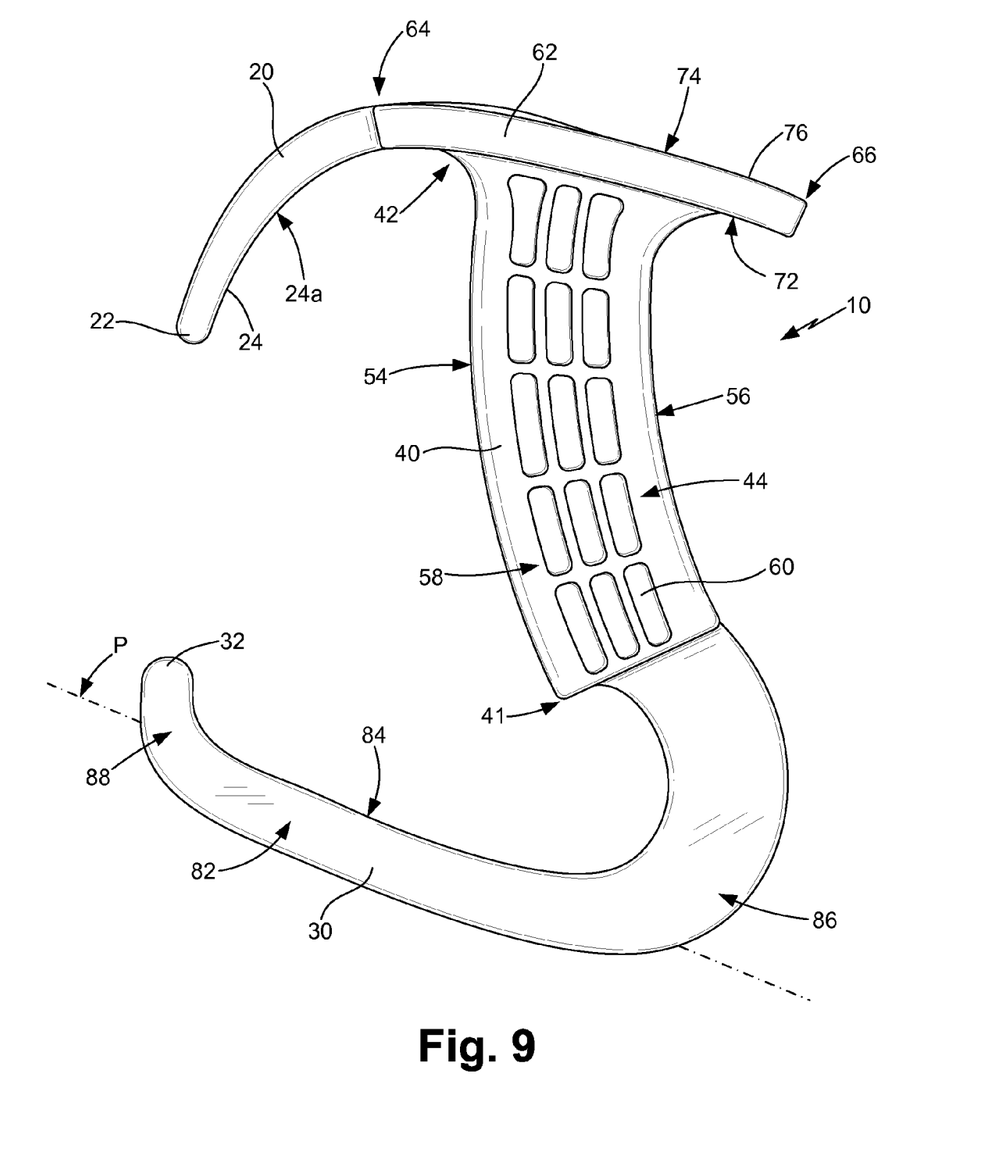
FIG. 9 is a side view of the preferred embodiment of the garment carrier and support device of the present invention.

As set forth in more detail below and shown in FIGS. 9 though 14, a garment carrier and support device 10 configured according to the preferred embodiment of the present invention is provided for collecting, carrying, and supporting clothing 15 hung on hangers 12. As with the above embodiments, the carrier device 10 of the preferred embodiment generally comprises an upper curved arm 20 and a lower curved arm 30 interconnected by an elongated handle member 40. In this embodiment, the upper curved arm 20, lower curved arm 30 and elongated handle member 40 are, preferably, integrally constructed of a lightweight yet strong material, such as plastic, plastic polymer and thermoplastic polymer (e.g. PVC). In one embodiment, the upper curved arm 20, lower curved arm 30 and handle member 40 are formed using an injection molding process. As will be readily apparent to those skilled in the art, these components may be made into any of a wide variety of cross-sectional shapes, including but not limited to a circular, oval, rectangular, square, hexagonal or any other polygonal shape. Example configurations of a generally rectangular configuration in FIG. 9 and a generally circular configuration in FIG. 15. In one embodiment, the carrier device 10 has a configuration with an overall length of approximately nine inches.

The lower end 41 and upper end 42 of handle member 40 define a handle grip 44 substantially between the lower 41 and upper 42 ends thereof. The handle grip 44 has a left or first side 50, a second or right side 52, a front side 54 and a back side 56 that define a handle outer surface 58, as shown in FIGS. 9 through 14. The dimensions of the handle outer surface 58 are selected so as to comfortably fit in the user's hand when he or she is using carrier device 10 to carry one or more hangers 12 having clothing 15 supported thereby. In the preferred embodiment, the handle outer surface 58 has a plurality of cut-outs or cavities 60 thereon that are provided to reduce the weight of carrier device 10 and the amount of material needed and, therefore, the cost to manufacture carrier device 10. In one exemplary embodiment, the first 50 and second 52 sides of handle grip 44 are approximately 1.25 inches wide and the front 54 and back 56 sides are approximately 0.75 inches wide.

Figure 10:
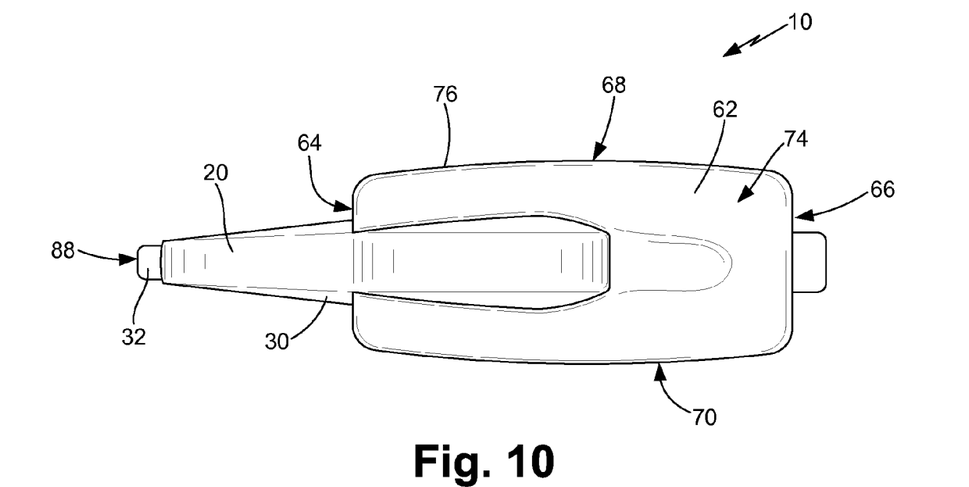
FIG. 10 is a top view of the garment carrier and support device of FIG. 9.
Figure 11:
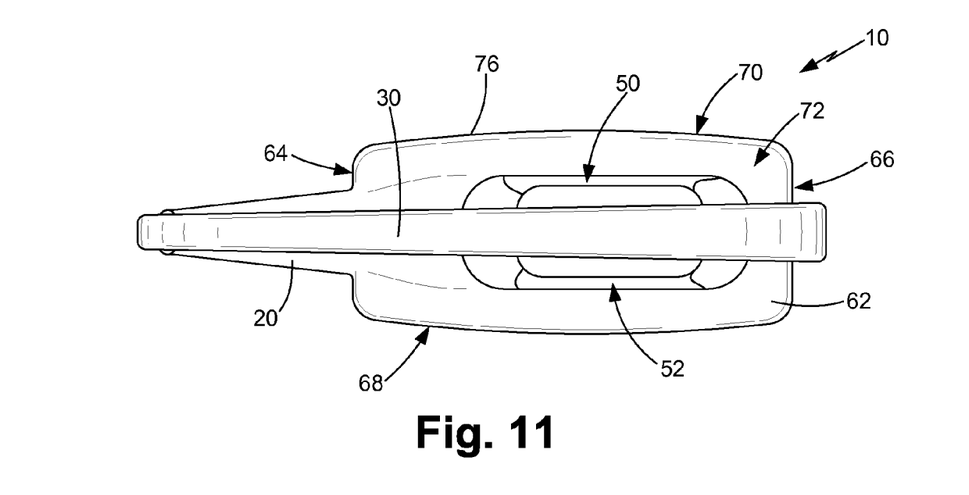
FIG. 11 is a bottom view of the garment carrier and support device of FIG. 9.
Figure 12:
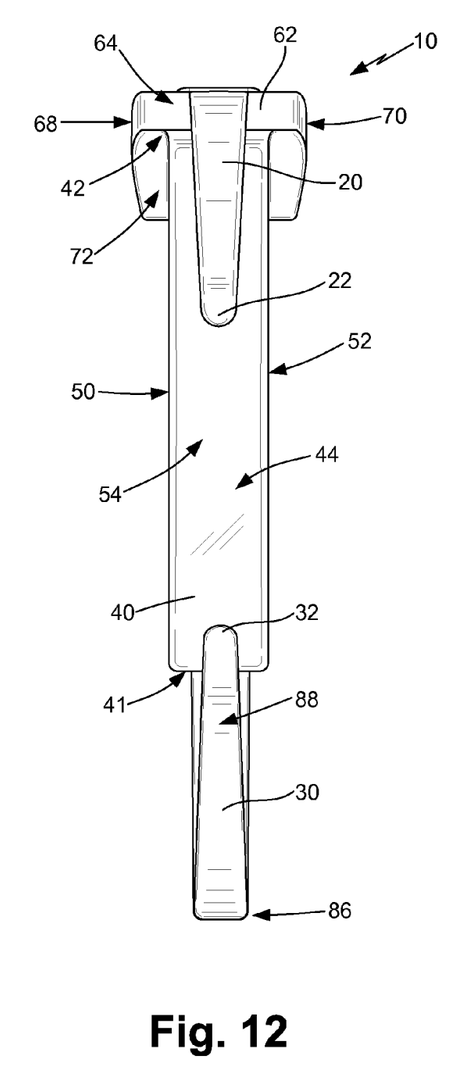
FIG. 12 is a front view of the garment carrier and support device of FIG. 9.
Figure 13:
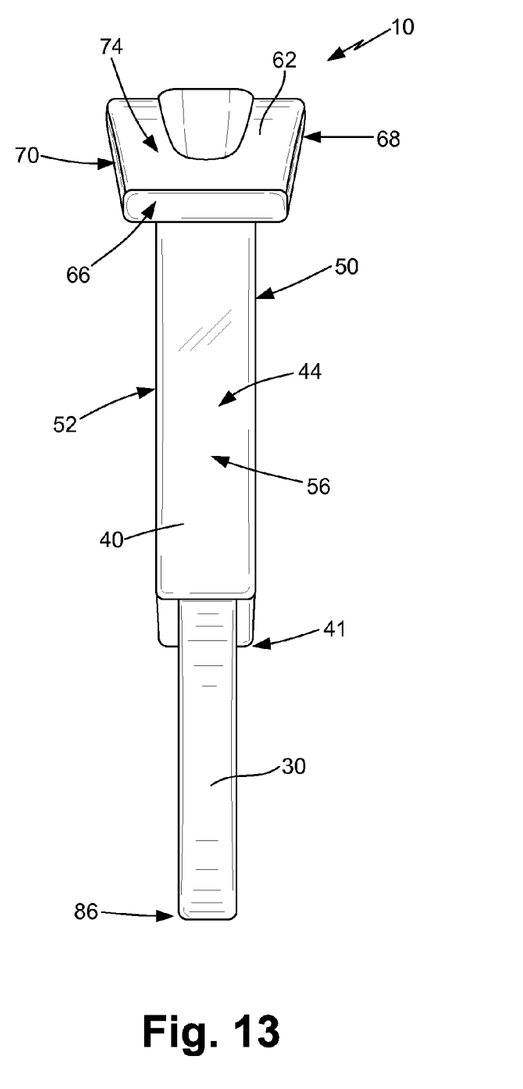
FIG. 13 is a back view of the garment carrier and support device of FIG. 9.
Figure 14:
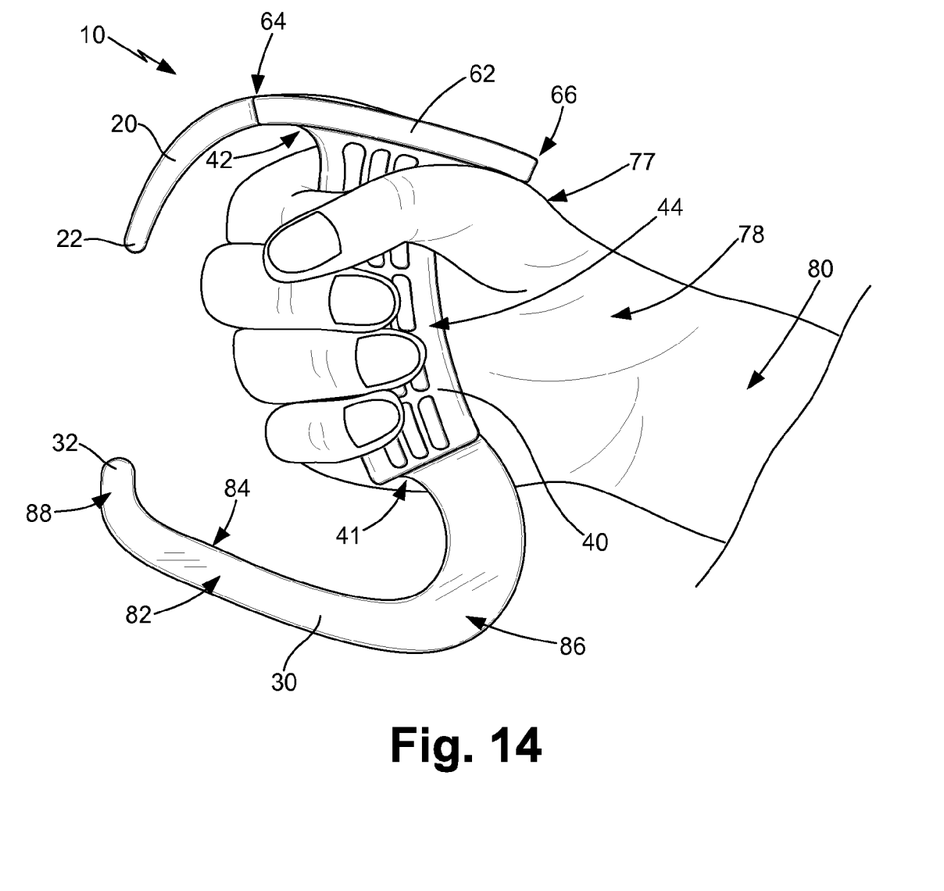
FIG. 14 is a side view of the garment carrier and support device of FIG. 9 shown with the user's hand positioned around the handle grip thereof.

Carrier device 10 of the preferred embodiment is also provided with a cap member 62 at the upper end 42 of handle member 40. In the preferred embodiment, the cap member 62 is integral with the handle member 40. Cap member 62 has a forward or front end 64, a rearward or back end 66, a left or first side 68 and a right or second side 70, as best shown in FIGS. 10 and 11, which define a downwardly disposed hand contact surface 72 and an upwardly disposed top surface 74, as shown in FIGS. 9 through 11. The hand contact surface 72 has a peripheral edge 76 that defines the outer dimensions of cap member 62. Both the peripheral edge 76 and hand contact surface 72 extend outwardly of the handle outer surface 58 such that the hand contact surface 72 abuts against the upper surface 77 of the hand 78 of a user 80, as shown in FIG. 14, when he or she is utilizing carrier device 10 to carry clothing 15 on one or more hangers 12. In a preferred embodiment, peripheral edge 76 extends sufficiently outwardly of handle outer surface 58 such that much of the weight of the clothing 15 is distributed across the user's hand 78 by the hand contact surface 72, thereby making it much easier for the user 80 to carry the clothing 15. In an exemplary embodiment, front 64 and back 66 ends of cap member 62 extend approximately 0.5 inches beyond handle outer surface 58 and the first 68 and second 70 sides extend approximately 0.35 inches beyond handle outer surface 58. As will be readily understood by those skilled in the art, an important benefit of hand contact surface 72 extending beyond handle outer surface 58 is that the weight from the clothing 15 will be distributed across a wider area of the user's hand 78, thereby lessening the amount of localized pressure on the hand 78 that would otherwise be felt by the user 80.

Figure 15:
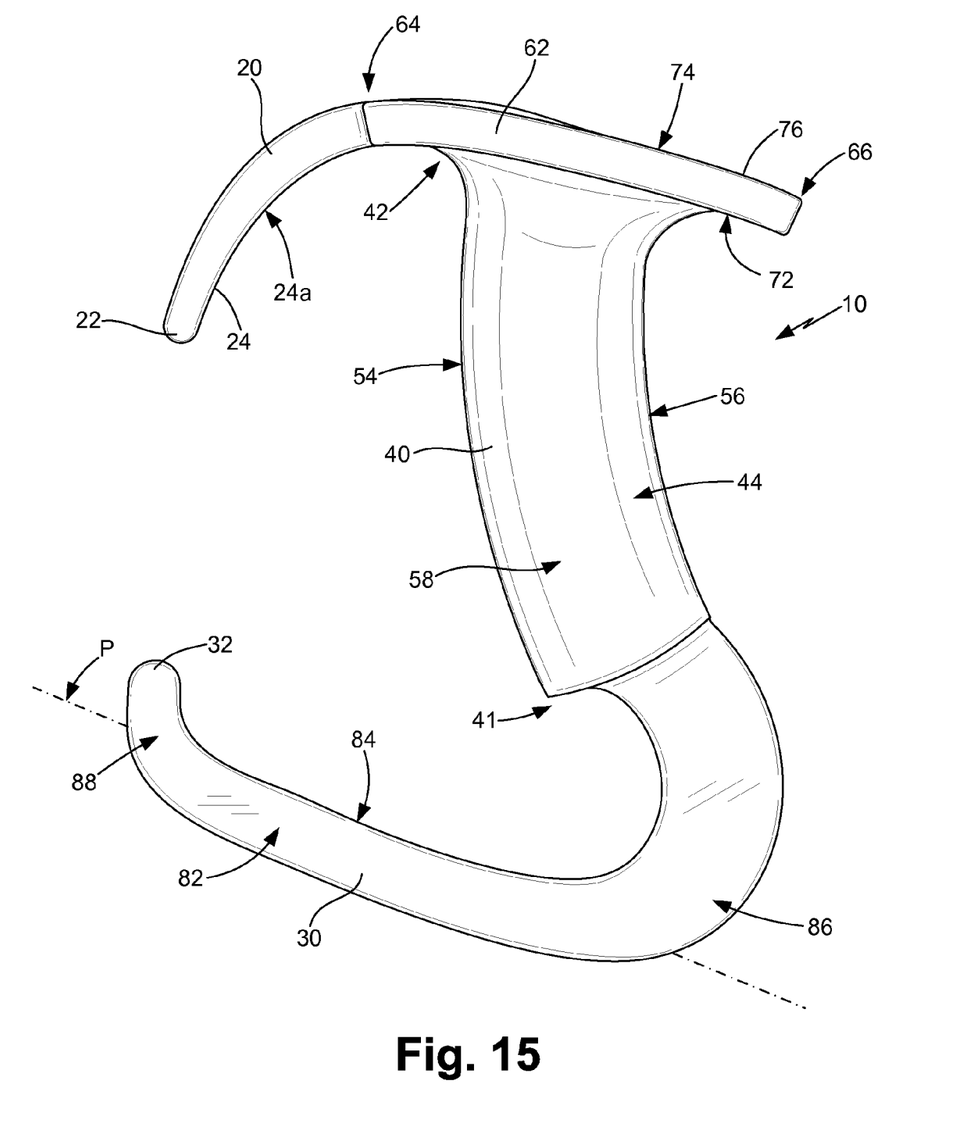
FIG. 15 is a side view of an alternative embodiment of the garment carrier and support device shown with a handle member having a generally circular configuration.

As shown in the figures, the upper curved arm 20 extends generally outward and downward from the cap member 62 so that it may beneficially engage a vehicular hook member 16, vehicle hand support 17, support rod 18 or other fixture on which the user 80 desires to hang carrier device 10 and clothing 15. In the preferred embodiment, the upper curved arm 20 extends outwardly of the front end 64 of cap member 62, as best shown in FIGS. 9, 14 and 15. The distal end 22 of upper curved arm 20 should be spaced apart from the front end 64 of cap member 62 so the upper curved arm 20 will sufficiently engage a vehicular hook member 16, vehicle hand support 17, support rod 18 or other fixture so as to support carrier device 10 while the carrier device 10 supports one or more hangers 12 each having clothing 15 thereon. As will be readily understood, unlike the above-described embodiments the present embodiment does not rely on the lower surface 24a as the hand support contact surface 24. Instead, the present invention uses the much more efficient and comfortable hand contact surface 72 of cap member 62 to engage the hand 78 of the user 80.

As shown in the various figures, the lower curved arm 30 extends generally outward from the lower end 41 of handle member 40. As described above, the lower curved arm 30 is utilized to engagedly support the hanger hook 13 of the hangers 12 to support clothing 15 on carrier device 10. In the present embodiment, the lower curved arm 30 has a generally upwardly inclined section 82 that defines a hook engaging surface 84 on which the hanger hook 13 of the hangers 12 are placed during use. When placed on carrier device 10, the hanger hook 13 of the first hanger 12 positioned on carrier device 10 will slide downward on the hook engaging surface 84 toward and abut against the curved section 86. The hanger hooks 13 of subsequently placed hangers 12 will "stack up" or abut against the hanger hook 13 of the first hanger 12 along hook engaging surface 84. To prevent the hangers 12 from easily sliding off of the carrier device 10 during use, the lower curved arm 30 has an upwardly extending section 88 near the distal end 32 thereof. As best shown in FIGS. 9, 14 and 15, upwardly extending section 88 positions the distal end 32 of lower curved arm 30 sufficiently above a plane P substantially along the hook engaging surface 84, as shown in FIG. 9, such that the hangers 12 supported by carrier device 10 will not easily slide off of the lower curved arm 30. In one embodiment, the upwardly extending section 88 is configured such that the distal end 32 is approximately 0.6 inches above the plane P. Although the spherical abutment element 35 described above can be utilized to prevent hangers 12 from sliding off of the lower curved arm 30, the inventor has found the configuration of the present embodiment is much easier and less expensive to manufacture while providing sufficient resistance to prevent the hangers 12 sliding off of lower curved arm 30 during use of carrier device 10.

In the preferred embodiment, the upper curved arm 20 and lower curved arm 30 are made integral with handle member 40 and cap member 62, preferably out of a plastic or plastic-like material and by a process such as injection molding. The various components of carrier device 10 should be made out of materials and in sufficient dimensions, which will be based at least partially on the materials chosen for carrier device 10, to safely support the amount of weight that will result from the clothing 15 being transported or hanging from carrier device 10 of the present invention.

In use, the user 80 grips his or her hand 78 around the handle grip 44, as shown in FIG. 14, and places the hanger hook 13 of one or more hangers 12, each supporting one or more articles of clothing 15, on the lower curved arm 30. The hanger hooks 13 will stack up along the hook engaging surface 84 of the upwardly inclined section 82 and be prevented from sliding off of the lower curved arm 30 by the upwardly extending section 88 at the distal end 32 thereof. The weight of the clothing 15 will apply a downward force on the hand 78 of the user 80. The pressure from that force will be distributed by the cap member 62 as a result of hand contact surface 72 abutting across a portion of the upper surface 77 of the hand 78, resulting in much less discomfort for the user 80 and making it easier for him or her to carry the clothing 15 across an area or to and from his or her vehicle. When the user 80 arrives at a location where the clothing 15 can be hung, such as at a vehicular hook member 16, a vehicular hand support 17, a support rod 18 or other fixture, the user hangs the carrier support 10, and the hangers 12 and clothing 15 supported thereby, on the fixture by engaging the upper curved arm 20 with the fixture. As such, the carrier device 10 can be utilized for easily, comfortably and efficiently transporting and hanging a plurality of hangers 12 each having one or more articles of clothing 15 thereon.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A garment carrier and support device to transport one or more hangers having clothing supported thereby, comprising:
    a handle member having a lower end and an upper end defining a handle grip substantially therebetween, said handle grip having a first side, a second side, a front side and a back side defining a handle outer surface;
    a cap member at said upper end of said handle member, said cap member having a front end, a back end, a first side and a second side defining a downwardly disposed hand contact surface and a peripheral edge, said hand contact surface and said peripheral edge extending outwardly relative to said handle outer surface so as to abut an upper surface of a hand of a user holding said garment carrier and support device so as to distribute the weight of the clothing on the hand;
    an upper curved arm extending generally outward and downward from said cap member;
    a lower curved arm extending generally outward from said lower end of said handle member to receive and support a hanger hook of each of the hangers; and wherein said handle member, said cap member, said upper curved arm and said lower curved arm are integral.

2. The garment carrier and support device of claim 1, wherein said upper curved arm extends outwardly and downwardly from said front end of said cap member.

3. The garment carrier and support device of claim 1, wherein said lower curved arm has a generally upwardly inclined section defining a hook engaging surface on which the hanger hooks are placed.

4. The garment carrier and support device of claim 3, wherein said upwardly inclined section disposes a distal end of said lower curved arm above a plane substantially along said hook engaging surface to generally prevent said hanger hooks from sliding off of said lower curved arm.

5. The garment carrier and support device of claim 1, wherein said garment carrier and support device is injection molded.

6. The garment carrier and support device of claim 1, wherein said handle member has a plurality of cavities in said handle outer surface.

7. The garment carrier and support device of claim 1, wherein said upper curved arm is adapted for positioning over a vehicular hook member, a vehicular hand support and/or a support rod.

8. The garment carrier and support device of claim 1 further comprising means for generally preventing said hanger hooks from sliding off of said lower curved arm.

9. The garment carrier and support device of claim 1, wherein a distal end of said lower curved arm is positioned so as to generally prevent said hanger hooks from sliding off of said lower curved arm.

10. A garment carrier and support device to transport one or more hangers having clothing supported thereby, comprising:
- a handle member having a lower end and an upper end defining a handle grip substantially therebetween, said handle grip having a first side, a second side, a front side and a back side defining a handle outer surface;
- a cap member at said upper end of said handle member, said cap member having a front end, a back end, a first side and a second side defining a downwardly disposed hand contact surface and a peripheral edge, said hand contact surface and said peripheral edge extending outwardly relative to said handle outer surface so as to abut an upper surface of a hand of a user holding said garment carrier and support device so as to distribute the weight of the clothing on the hand;
- an upper curved arm extending generally outward and downward from said front end of said cap member; and
- a lower curved arm extending generally outward from said lower end of said handle member to receive and support a hanger hook of each of the hangers, said lower curved arm having a generally upwardly inclined section defining a hook engaging surface on which the hanger hooks are placed, said upwardly inclined section disposing a distal end of said lower curved arm above a plane substantially along said hook engaging surface to generally prevent said hanger hooks from sliding off of said lower curved arm; and wherein said handle member, said cap member, said upper curved arm and said lower curved arm are integral.

11. The garment carrier and support device of claim 10, wherein said garment carrier and support device is injection molded.

12. The garment carrier and support device of claim 10, wherein said handle member has a plurality of cavities in said handle outer surface.

13. The garment carrier and support device of claim 10, wherein said upper curved arm is adapted for positioning over a vehicular hook member, a vehicular hand support and/or a support rod.

* * * * *